United States Patent
Droux et al.

(10) Patent No.: US 7,792,140 B2
(45) Date of Patent: Sep. 7, 2010

(54) REFLECTING THE BANDWIDTH ASSIGNED TO A VIRTUAL NETWORK INTERFACE CARD THROUGH ITS LINK SPEED

(75) Inventors: Nicolas G. Droux, Rio Rancho, NM (US); Kais Belgaied, Sunnyvale, CA (US); Sunay Tripathi, San Jose, CA (US)

(73) Assignee: Oracle America Inc., Redwood City, CA (US)

( * ) Notice: Subject to any disclaimer, the term of this patent is extended or adjusted under 35 U.S.C. 154(b) by 828 days.

(21) Appl. No.: 11/479,161

(22) Filed: Jun. 30, 2006

(65) Prior Publication Data

US 2008/0002739 A1   Jan. 3, 2008

(51) Int. Cl.
*H04L 12/66* (2006.01)

(52) U.S. Cl. .................................................. 370/463

(58) Field of Classification Search ............... None
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,163,539 A | 12/2000 | Alexander et al. | |
| 6,321,081 B1 * | 11/2001 | Lee ........................... | 455/423 |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,111,303 B2 * | 9/2006 | Macchiano et al. ......... | 719/313 |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 7,397,800 B2 * | 7/2008 | Elzur ........................ | 370/394 |
| 7,496,699 B2 * | 2/2009 | Pope et al. ................... | 710/52 |
| 7,685,281 B1 * | 3/2010 | Saraiya et al. ............. | 709/226 |
| 2002/0118644 A1 * | 8/2002 | Moir ....................... | 370/230.1 |
| 2003/0037154 A1 | 2/2003 | Poggio et al. | |
| 2004/0267866 A1 | 12/2004 | Carollo et al. | |
| 2005/0111455 A1 | 5/2005 | Nozue et al. | |

(Continued)

OTHER PUBLICATIONS

"Solaris Networking—The Magic Revealed (Part I)"; Sunay Tripathi's Solaris Networking Weblog; Nov. 14, 2005, pp. 1-22 (22 pages).

(Continued)

*Primary Examiner*—Kwang B Yao
*Assistant Examiner*—Alex Skripnikov
(74) *Attorney, Agent, or Firm*—Osha • Liang LLP

(57) ABSTRACT

A method for indicating bandwidth for a virtual network interface card (NIC) includes receiving a bandwidth trigger for a bandwidth of a first virtual NIC operatively connected to a NIC, wherein the NIC is associated with a network bandwidth, obtaining a bandwidth allocation stored in the first virtual NIC in response to the bandwidth trigger, wherein the bandwidth allocation corresponds to the bandwidth of the first virtual NIC, and wherein the bandwidth allocation corresponds to a portion of the network bandwidth, and returning the bandwidth allocation to a component associated with the virtual NIC.

17 Claims, 4 Drawing Sheets

U.S. PATENT DOCUMENTS

| | | |
|---|---|---|
| 2005/0135243 A1 | 6/2005 | Lee et al. |
| 2005/0138620 A1 | 6/2005 | Lewites |
| 2005/0174962 A1* | 8/2005 | Gurevich ............... 370/328 |
| 2006/0041667 A1 | 2/2006 | Ahn et al. |
| 2006/0045089 A1 | 3/2006 | Bacher et al. |
| 2006/0070066 A1 | 3/2006 | Grobman |
| 2006/0174324 A1 | 8/2006 | Zur et al. |
| 2006/0206300 A1* | 9/2006 | Garg et al. ............... 703/27 |

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 pages).

* cited by examiner

REFLECTING THE BANDWIDTH ASSIGNED TO A VIRTUAL NETWORK INTERFACE CARD THROUGH ITS LINK SPEED

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228 .

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790 .

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817;"Generalized Serialization Queue Framework for Protocol Processing" with U.S. application Ser. No. 11/479,947; "Serialization Queue Framework for Transmitting Packets" with U.S. application Ser. No. 11/479,143.

BACKGROUND

Network traffic is transmitted from a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are forwarded to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for indicating bandwidth for a virtual network interface card (NIC), comprising receiving a bandwidth trigger for a bandwidth of a first virtual NIC operatively connected to a NIC, wherein the NIC is associated with a network bandwidth, obtaining a bandwidth allocation stored in the first virtual NIC in response to the bandwidth trigger, wherein the bandwidth allocation corresponds to the bandwidth of the first virtual NIC, and wherein the bandwidth allocation corresponds to a portion of the network bandwidth, and returning the bandwidth allocation to a component associated with the virtual NIC.

In general, in one aspect, the invention relates to a system for indicating bandwidth for a virtual network interface card (NIC), comprising a NIC associated with a network bandwidth, a host, operatively connected to the NIC, comprising a first virtual NIC operatively connected to the NIC, and a bandwidth allocation stored in the first virtual NIC, wherein the host is configured to receive a bandwidth trigger for a bandwidth of the first virtual NIC, obtain the bandwidth allocation stored in the first virtual NIC in response to the bandwidth trigger, wherein the bandwidth allocation corresponds to the bandwidth of the first virtual NIC, and wherein the bandwidth allocation corresponds to a portion of the network bandwidth, and return the bandwidth allocation to a component associated with the virtual NIC.

In general, in one aspect, the invention relates to a computer usable medium having computer readable code embodied therein for causing a computer system to execute a method for indicating bandwidth for a virtual network interface card (NIC), comprising receiving a bandwidth trigger for a bandwidth of a first virtual NIC operatively connected to a NIC, wherein the NIC is associated with a network bandwidth, obtaining a bandwidth allocation stored in the first virtual NIC in response to the bandwidth trigger, wherein the bandwidth allocation corresponds to the bandwidth of the first virtual NIC, and wherein the bandwidth allocation corresponds to a portion of the network bandwidth, and returning the bandwidth allocation to a component associated with the virtual NIC.

Other aspects of the invention will be apparent from the following description and the appended claims.

DETAILED DESCRIPTION

Figure 1:
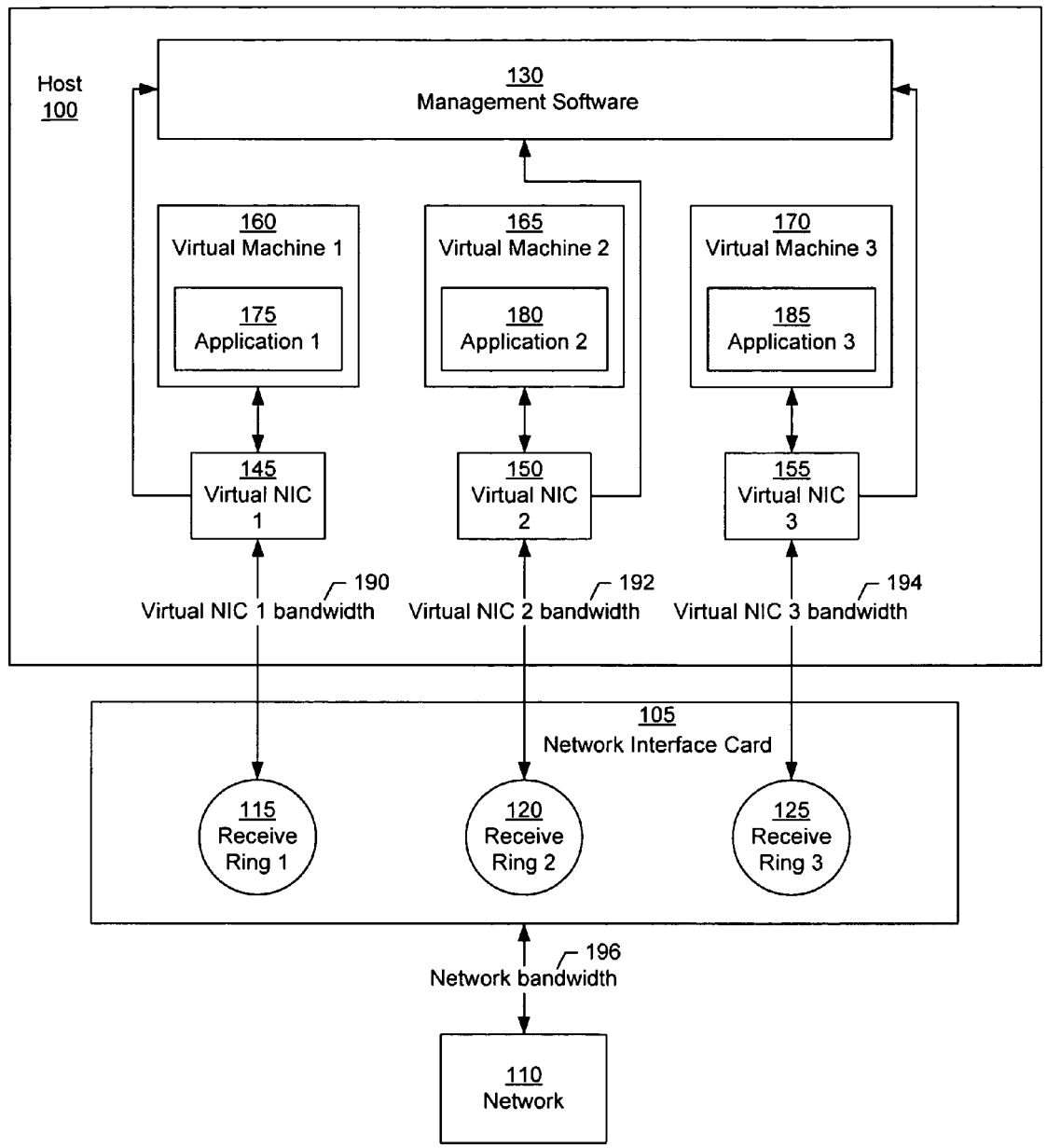
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to report link speeds associated with virtual network interface cards (NICs). In one or more embodiments of the invention, multiple virtual NICs are associated with a single physical NIC, where the single physical NIC is associated with a network bandwidth. The virtual NICs share the network bandwidth of the single physical NIC. In some cases, each virtual NIC is assigned a bandwidth.

Further, embodiments of the invention provide a method and apparatus to report link speeds for virtual NICs based on the allocated bandwidth for the virtual NICs. Instead of reporting the link speed of the physical NIC as the link speed of a virtual NIC connected to the physical NIC, embodiments of the invention report the link speed of a virtual NIC as the bandwidth allocation of the virtual NIC. In addition, embodiments of the invention allow changes in bandwidth allocation of a virtual NIC to be reported to the network stack associated with the virtual NIC. IN such embodiments, any applications or virtual machines connected to the network stack would subsequently receive a notification regarding the change in bandwidth allocation of the associated virtual NIC. In one or more embodiments of the invention, bandwidth and link speed are synonymous terms for data transfer rate.

FIG. 1 shows a schematic diagram of a system in accordance with one or more embodiments of the invention. As shown in FIG. 1, the system includes a host (100), a network interface card (NIC) (105), a network (110), multiple virtual NICs (e.g., virtual NIC 1 (145), virtual NIC 2 (150), virtual NIC 3 (155)), multiple virtual machines (e.g., virtual machine 1 (160), virtual machine 2 (165), virtual machine 3 (170)), and management software (130). Each of these components is described below.

The NIC (105) provides an interface between the host (100) and a network (110) (e.g., a local area network, a wide area network, a wireless network, etc.). More specifically, the NIC (105) includes a network interface (NI) (i.e., the hardware on the NIC used to interface with the network (110)). For example, the NI may correspond to an RJ-45 connector, a wireless antenna, etc. The packets received by the NI are then forwarded to other components on the NIC (105) for processing. In one embodiment of the invention, the NIC (105) includes one or more receive rings (e.g., receive ring 1 (115), receive ring 2 (120), receive ring 3 (125)). In one embodiment of the invention, the receive rings (e.g., receive ring 1 (115), receive ring 2 (120), receive ring 3 (125)) correspond to portions of memory within the NIC (105) used to temporarily store packets received from the network (110). Further, in one embodiment of the invention, a ring element of the receive rings (e.g., receive ring 1 (115), receive ring 2 (120), receive ring 3 (125)) may point to host memory.

In one or more embodiments of the invention, the host (100) may include a device driver (not shown) and one or more virtual NICs (e.g., virtual NIC 1 (145), virtual NIC 2 (150), virtual NIC 3 (155)). In one embodiment of the invention, the device driver provides an interface between the receive rings (e.g., receive ring 1 (115), receive ring 2 (120), receive ring 3 (125)) and the host (100). More specifically, the device driver (not shown) exposes the receive rings (e.g., receive ring 1 (115), receive ring 2 (120), receive ring 3 (125)) to the host (100). In one embodiment of the invention, each of the virtual NICs (e.g., virtual NIC 1 (145), virtual NIC 2 (150), virtual NIC 3 (155)) is associated with one or more receive rings (e.g., receive ring 1 (115), receive ring 2 (120), receive ring 3 (125)). In other words, a virtual NIC (e.g., virtual NIC 1 (145), virtual NIC 2 (150), virtual NIC 3 (155)) receives incoming packets from the corresponding receive ring (e.g., receive ring 1 (115), receive ring 2 (120), receive ring 3 (125)).

In one or more embodiments of the invention, the virtual NICs (e.g., virtual NIC 1 (145), virtual NIC 2 (150), virtual NIC 3 (155)) are operatively connected to virtual machines (e.g., virtual machine 1 (160), virtual machine 2 (165), virtual machine 3 (170)) via virtual network stacks (not shown). The virtual NICs (e.g., virtual NIC 1 (145), virtual NIC 2 (150), virtual NIC 3 (155)) provide an abstraction layer between the NIC (105) and the virtual machines (e.g., virtual machine 1 (160), virtual machine 2 (165), virtual machine 3 (170)) on the host (100). More specifically, each virtual NIC (e.g., virtual NIC 1 (145), virtual NIC 2 (150), virtual NIC 3 (155)) operates like a NIC (105). For example, in one embodiment of the invention, each virtual NIC (e.g., virtual NIC 1 (145), virtual NIC 2 (150), virtual NIC 3 (155)) is associated with one or more Internet Protocol (IP) addresses, one or more ports, and configured to handle one or more protocol types. Thus, while the host (100) may be operatively connected to a single NIC (105), virtual machines (e.g., virtual machine 1 (160), virtual machine 2 (165), virtual machine 3 (170)) executing on the host (100) operate as if the host (100) is bound to multiple NICs. Further, each virtual machine (e.g., virtual machine 1 (160), virtual machine 2 (165), virtual machine 3 (170)) has no knowledge of the other virtual machines residing on the host. To each virtual machine (e.g., virtual machine 1 (160), virtual machine 2 (165), virtual machine 3 (170)), the corresponding virtual NIC (e.g., virtual NIC 1 (145), virtual NIC 2 (150), virtual NIC 3 (155)) is indistinguishable from a physical NIC (105). Further, each virtual NIC (e.g., virtual NIC 1 (145), virtual NIC 2 (150), virtual NIC 3 (155)) includes properties of a physical NIC, such as link speed, Media Access Control (MAC) address, etc.

In one embodiment of the invention, each virtual network stack (not shown) includes functionality to process packets in accordance with various protocols used to send and receive packets (e.g., Transmission Communication Protocol (TCP), Internet Protocol (IP), User Datagram Protocol (UDP), etc.). Further, each virtual network stack may also include functionality, as needed, to perform additional processing on the incoming and outgoing packets. This additional processing may include, but is not limited to, cryptographic processing, firewall routing, etc.

In one or more embodiments of the invention, the virtual network stacks correspond to network stacks with network layer and transport layer functionality. In one embodiment of the invention, network layer functionality corresponds to functionality to manage packet addressing and delivery on a network (e.g., functionality to support Internet Protocol, Address Resolution Protocol (ARP), Internet Control Message Protocol (ICMP), etc.). In one embodiment of the invention, transport layer functionality corresponds to functionality to manage the transfer of packets on the network (e.g., functionality to support TCP, UDP, Stream Control Transmission Protocol (SCTP), etc.).

As shown in FIG. 1, the NIC (105) is associated with a network bandwidth (196). In one or more embodiments of the invention, the network bandwidth (196) relates to the data rate supported by a network connection on the NIC (105). In other words, the network bandwidth (196) represents the capacity of the connection between the NIC (105) and the network (110). In addition, each virtual NIC (e.g., virtual NIC 1 (145), virtual NIC 2 (150), virtual NIC 3 (155)) is associated with a virtual NIC bandwidth (e.g., virtual NIC 1 bandwidth (190), virtual NIC 2 bandwidth (192), virtual NIC 3 bandwidth (194)). In one or more embodiments of the invention, the network bandwidth (196) is allocated among the virtual NIC bandwidths (e.g., virtual NIC 1 bandwidth (190), virtual NIC 2 bandwidth (192), virtual NIC 3 bandwidth (194)). Those skilled in the art will appreciate that the network bandwidth (196) does not need to be completely divided up among the virtual NICs (e.g., virtual NIC 1 (145), virtual NIC 2 (150), virtual NIC 3 (155)); for example, each of three virtual NICs could share 50% of the network bandwidth (196), whereas the other 50% of the network bandwidth is left unallocated.

Each virtual NIC (e.g., virtual NIC 1 (145), virtual NIC 2 (150), virtual NIC 3 (155)) is also operatively connected to a piece of management software (130). In one or more embodiments of the invention, the management software (130) is responsible for creating each virtual NIC (e.g., virtual NIC 1 (145), virtual NIC 2 (150), virtual NIC 3 (155)), changing the properties of each virtual NIC (e.g. MAC address, IP address), assigning bandwidth to each virtual NIC (e.g., virtual NIC 1 bandwidth (190), virtual NIC 2 bandwidth (192), virtual NIC 3 bandwidth (194)), and listing the virtual NICs on the host (100). The management software (130) is also responsible for directing requests for bandwidth from applications (e.g., application 1 (175), application 2 (180), application 3 (185)) to the virtual NICs (e.g., virtual NIC 1 (145), virtual NIC 2 (150), virtual NIC 3 (155)). In addition, the management software (130) may be responsible for performing changes in bandwidth allocation for each virtual NIC (e.g., virtual NIC 1 (145), virtual NIC 2 (150), virtual NIC 3 (155)), and for sending a notification of a bandwidth reallocation to the virtual network stack (not shown) associated with the virtual NIC. In one or more embodiments of the invention, the management software (130) acts as an interface that provides virtual NIC (e.g., virtual NIC 1 (145), virtual NIC 2 (150), virtual NIC 3 (155)) configuration services to interested parties, such as applications and administrative tasks.

In one or more embodiments of the invention, a notification of a bandwidth reallocation is transmitted by a virtual NIC (e.g., virtual NIC 1 (145), virtual NIC 2 (150), virtual NIC 3 (155)) and received by a virtual network stack, which relays the notification to the corresponding virtual machine (e.g., virtual machine 1 (160), virtual machine 2 (165), virtual machine 3 (170)) and any applications (e.g., application 1 (175), application 2 (180), application 3 (185)) running on that virtual machine. In one or more embodiments of the invention, a link speed query for a virtual NIC (e.g., virtual NIC 1 (145), virtual NIC 2 (150), virtual NIC 3 (155)) is sent by an application (e.g., application 1 (175), application 2 (180), application 3 (185)) running within the virtual machine (e.g., virtual machine 1 (160), virtual machine 2 (165), virtual machine 3 (170)) associated with that virtual NIC.

In one or more embodiments of the invention, the virtual NIC bandwidth (e.g., virtual NIC 1 bandwidth (190), virtual NIC 2 bandwidth (192), virtual NIC 3 bandwidth (194)) associated with a virtual NIC (e.g., virtual NIC 1 (145), virtual NIC 2 (150), virtual NIC 3 (155)) is reported when a link speed query for the virtual NIC is received. The management software (130) passes the link speed query to the virtual NIC (e.g., virtual NIC 1 (145), virtual NIC 2 (150), virtual NIC 3 (155)), which reports its bandwidth (e.g., virtual NIC 1 bandwidth (190), virtual NIC 2 bandwidth (192), virtual NIC 3 bandwidth (194)) to the virtual network stack or virtual machine (e.g., virtual machine 1 (160), virtual machine 2 (165), virtual machine 3 (170)) requesting the link speed query. In one or more embodiments of the invention, each virtual NIC (e.g., virtual NIC 1 (145), virtual NIC 2 (150), virtual NIC 3 (155)) stores its bandwidth allocation (e.g., virtual NIC 1 bandwidth (190), virtual NIC 2 bandwidth (192), virtual NIC 3 bandwidth (194)) internally. The management software (130) is responsible for changing the bandwidth allocation (e.g., virtual NIC 1 bandwidth (190), virtual NIC 2 bandwidth (192), virtual NIC 3 bandwidth (194)) and directing requests for bandwidth to the virtual NICs (e.g., virtual NIC 1 (145), virtual NIC 2 (150), virtual NIC 3 (155)), but the bandwidth allocation is stored in each virtual NIC.

Those skilled in the art will appreciate that if the network bandwidth (196) is reported as the bandwidth of a virtual NIC (e.g., virtual NIC 1 (145), virtual NIC 2 (150), virtual NIC 3 (155)), the capacity of the virtual NIC will appear to be higher than the actual bandwidth allocation for that virtual NIC. In one or more embodiments of the invention, bandwidth allocation information for each virtual NIC (e.g., virtual NIC 1 (145), virtual NIC 2 (150), virtual NIC 3 (155)) is stored inside a Management Information Base (MIB) object.

Figure 2:
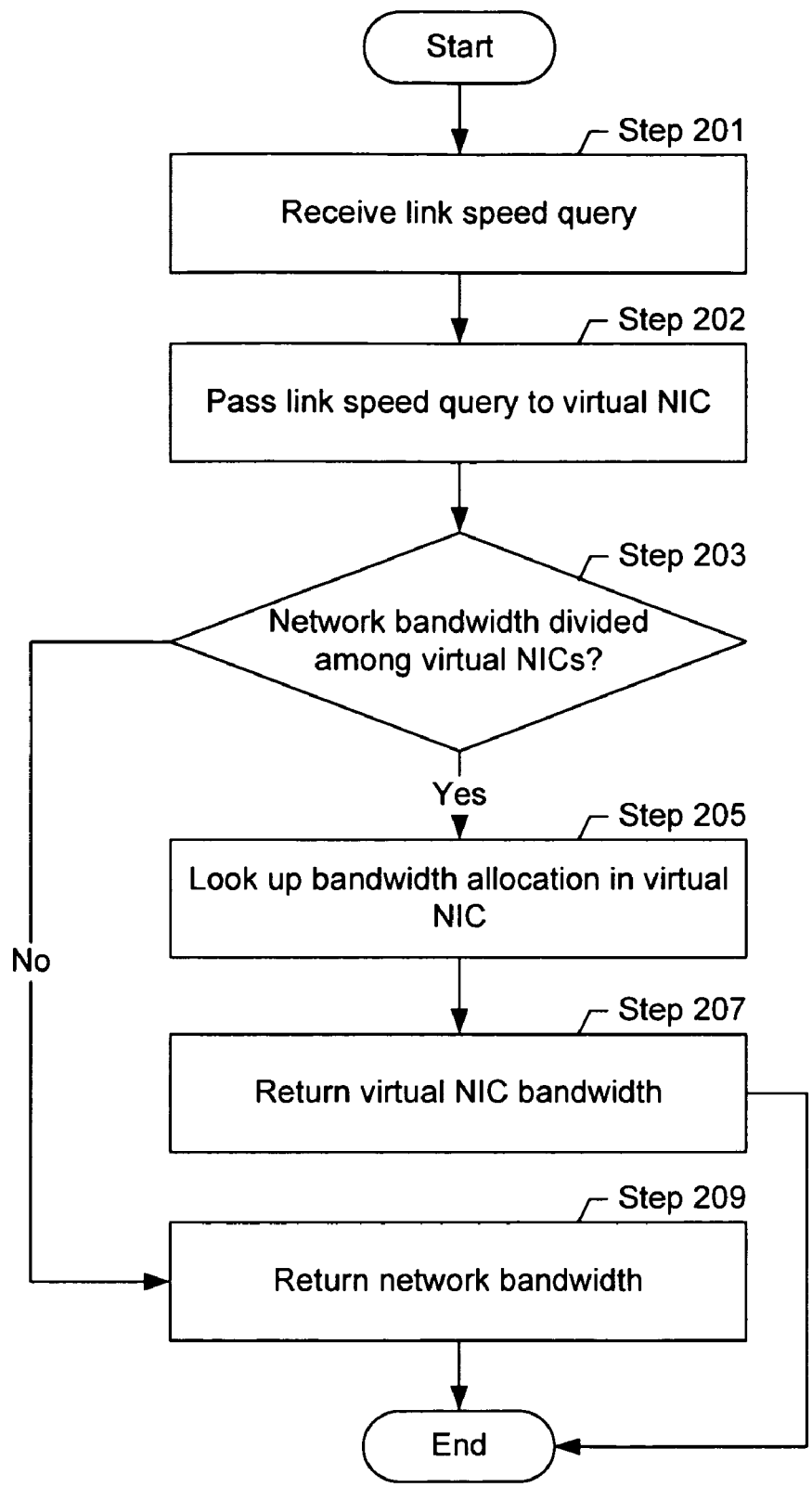
FIGS. 2-3 show flow charts in accordance with one or more embodiments of the invention.

FIG. 2 shows a flow diagram in accordance with one or more embodiments of the invention. First, a link speed query is received (Step 201) for a virtual NIC. The link speed query may be generated by an application residing on a virtual machine associated with the virtual NIC, an application residing on a virtual machine associated with another virtual NIC, or by another application located on another physical host. Next, the link speed query is passed to the relevant virtual NIC (Step 202). A determination is then made about whether the network bandwidth is divided among multiple virtual NICs (Step 203). In other words, a determination is made about whether the virtual NIC is allocated the entire network bandwidth. If the virtual NIC is allocated the entire network bandwidth, then the network bandwidth is returned (Step 209). Otherwise, the virtual NIC looks up its bandwidth allocation (Step 205), which is stored internally within the virtual NIC, and returns the bandwidth allocation to the application that requested the bandwidth allocation (Step 207).

Figure 3:
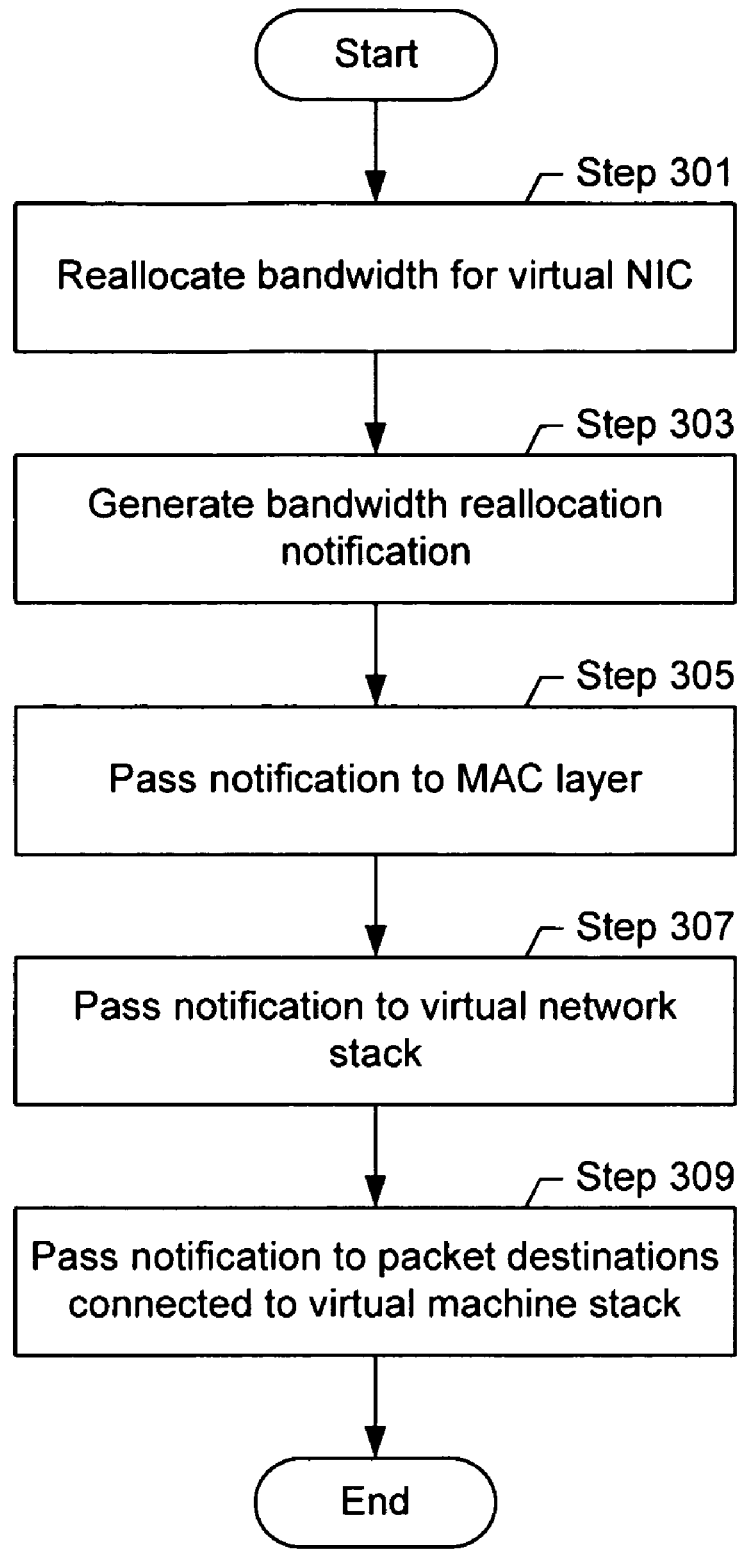

FIG. 3 shows a flow diagram in accordance with one or more embodiments of the invention. Initially, a bandwidth reallocation occurs (Step 301). In one or more embodiments of the invention, a bandwidth reallocation may occur when a virtual NIC requires more bandwidth than is currently allocated, a new virtual NIC is added to the system, a virtual NIC is removed from the system, etc. In one or more embodiments of the invention, a bandwidth reallocation involves changing field values in a MIB object by a piece of management software operatively connected to the virtual NIC.

Once the bandwidth reallocation has taken place, a bandwidth reallocation notification is generated (Step 303). In one or more embodiments of the invention, a bandwidth reallocation notification is generated by the management software. Alternatively, the virtual NIC generates the bandwidth reallocation notification upon a change in the value of its bandwidth allocation by the management software. Next, the bandwidth reallocation notification is passed to the Media Access Control (MAC) of the host layer (Step 305). In one or more embodiments of the invention, the MAC layer corresponds to the data link level MAC layer associated with the virtual NIC and the physical NIC; the MAC layer is responsible for moving data packets between the NIC and virtual NICs, as well as other NICs on other hosts, using MAC protocols. From the MAC layer, the notification is passed to the virtual network stack (Step 307) of the virtual machine corresponding to the virtual NIC. There, the bandwidth reallocation notification is relayed to packet destinations connected to the virtual network stack (Step 309). In one or more embodiments of the invention, packet destinations include applications or containers running on the virtual machine.

Figure 4:
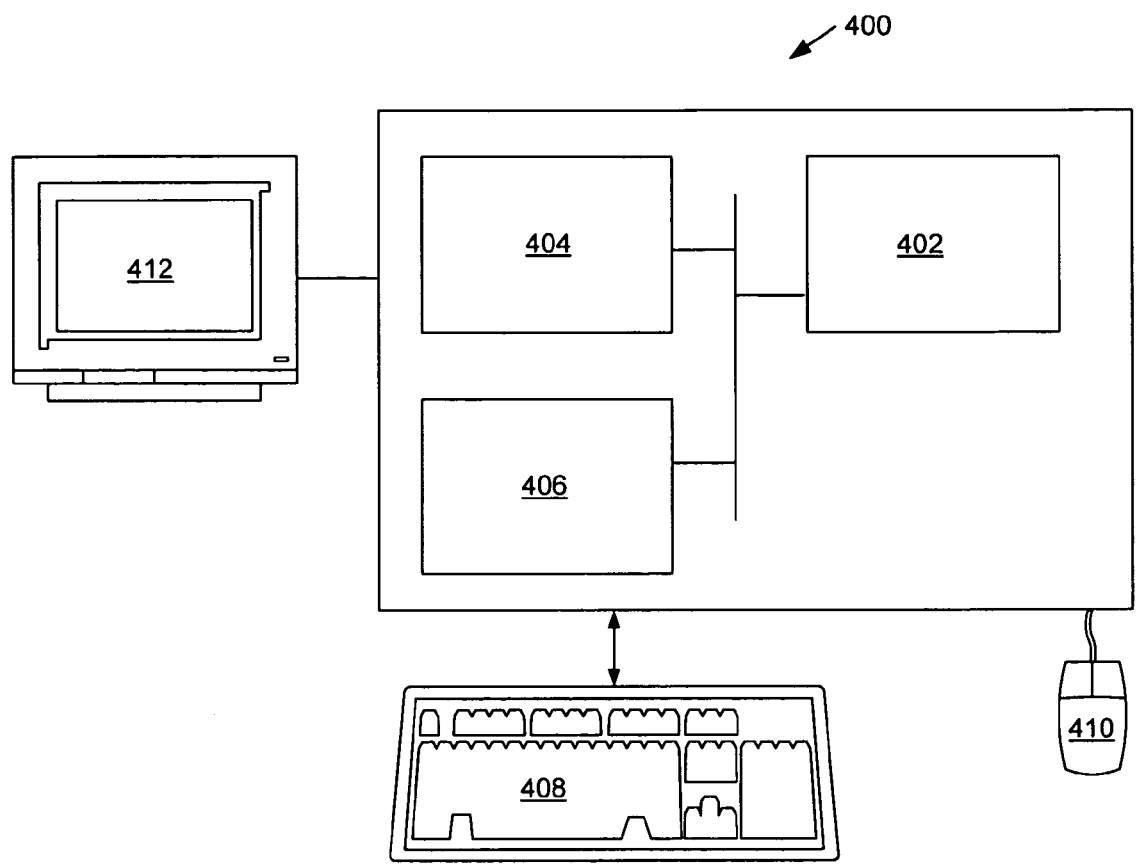
FIG. 4 shows a computer system in accordance with one or more embodiments of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g, network interface card, virtual NICs, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for indicating bandwidth for a first virtual network interface card (NIC), comprising:
   receiving an indication to return a bandwidth of the first virtual NIC, wherein the first virtual NIC is located in a host and is operatively connected to a NIC, wherein the NIC is operatively connected to the host and is associated with a network bandwidth available to the host, and wherein the host comprises a media access control (MAC) layer;
   obtaining a first bandwidth allocation stored in the first virtual NIC in response to the indication, wherein the first bandwidth allocation corresponds to a bandwidth allocated to the first virtual NIC, wherein the first virtual NIC is associated with a virtual network stack, and wherein the first bandwidth allocation corresponds to a portion of the network bandwidth;
   returning the first bandwidth allocation to a component associated with the first virtual NIC;
   receiving a request to reallocate the first bandwidth allocation to a second bandwidth allocation; and
   in response to the request:
     reallocating the first bandwidth allocation to the second bandwidth allocation,
     generating a bandwidth reallocation notification upon reallocating the first bandwidth allocation to the second bandwidth allocation, and
     sending the bandwidth reallocation notification to the virtual network stack via the MAC layer.

2. The method of claim 1, wherein the indication comprises a link speed query for the first virtual NIC.

3. The method of claim 2, wherein the component associated with the first virtual NIC comprises an application executing on the host, and wherein the link speed query for the first virtual NIC is sent by the application.

4. The method of claim 1, wherein the bandwidth allocated to the first virtual NIC is returned to the virtual network stack associated with the first virtual NIC.

5. The method of claim 1, wherein the bandwidth reallocation is performed by management software.

6. The method of claim 1, wherein a sum of the bandwidth allocated to the first virtual NIC and a bandwidth allocated to a second virtual NIC operatively connected to the NIC is equal to the network bandwidth.

7. The method of claim 6, wherein the first virtual NIC and the second virtual NIC are associated with the Media Access Control (MAC) layer of the host, and wherein the first virtual NIC and the second virtual NIC each associated with one or more Internet Protocol (IP) address.

8. A system for indicating bandwidth for a first virtual network interface card (NIC), comprising:
- a NIC associated with a network bandwidth;
- a host, operatively connected to the NIC, comprising:
  - a first virtual NIC operatively connected to the NIC; and
  - a bandwidth allocation stored in the first virtual NIC;
  - wherein the host is configured to:
    - receiving an indication to return a bandwidth of the first virtual NIC,
      wherein the first virtual NIC is located in a host and is operatively connected to a NIC, wherein the NIC is operatively connected to the host and is associated with a network bandwidth available to the host, and wherein the host comprises a media access control (MAC) layer;
    - obtaining a first bandwidth allocation stored in the first virtual NIC in response to the indication, wherein the first bandwidth allocation corresponds to a bandwidth allocated to the first virtual NIC, wherein the first virtual NIC is associated with a virtual network stack, and wherein the first bandwidth allocation corresponds to a portion of the network bandwidth;
    - returning the first bandwidth allocation to a component associated with the first virtual NIC;
    - receiving a request to reallocate the first bandwidth allocation to a second bandwidth allocation;
    - in response to the request:
      - reallocating the first bandwidth allocation to the second bandwidth allocation,
      - generating a bandwidth reallocation notification upon reallocating the first bandwidth allocation to the second bandwidth allocation, and
      - sending the bandwidth reallocation notification to the virtual network stack via the MAC layer.

9. The system of claim 8, wherein the indication comprises a link speed query for the first virtual NIC.

10. The system of claim 8, wherein a sum of the bandwidth allocated to the first virtual NIC and a bandwidth allocated to a second virtual NIC operatively connected to the NIC is equal to the network bandwidth, wherein the first virtual NIC and the second virtual NIC are associated with the Media Access Control (MAC) layer of the host, and wherein the first virtual NIC and the second virtual NIC each associated with one or more Internet Protocol (IP) address.

11. A non-transitory computer usable medium having computer readable code embodied therein for causing a computer system to execute a method for indicating bandwidth for a virtual network interface card (NIC), comprising:
- receiving an indication to return a bandwidth of the first virtual NIC, wherein the first virtual NIC is located in a host and is operatively connected to a NIC, wherein the NIC is operatively connected to the host and is associated with a network bandwidth available to the host, and wherein the host comprises a media access control (MAC) layer;
- obtaining a first bandwidth allocation stored in the first virtual NIC in response to the indication, wherein the first bandwidth allocation corresponds to a bandwidth allocated to the first virtual NIC, wherein the first virtual NIC is associated with a virtual network stack, and wherein the first bandwidth allocation corresponds to a portion of the network bandwidth;
- returning the first bandwidth allocation to a component associated with the first virtual NIC;
- receiving a request to reallocate the first bandwidth allocation to a second bandwidth allocation; and
- in response to the request:
  - reallocating the first bandwidth allocation to the second bandwidth allocation,
  - generating a bandwidth reallocation notification upon reallocating the first bandwidth allocation to the second bandwidth allocation, and sending the bandwidth reallocation notification to the virtual network stack via the MAC layer.

12. The non-transitory computer usable medium of claim 11, wherein the indication comprises a link speed query for the first virtual NIC.

13. The non-transitory computer usable medium of claim 12, wherein the component associated with the first virtual NIC comprises an application executing on the host, and wherein the link speed query for the first virtual NIC is sent by the application.

14. The non-transitory computer usable medium of claim 11, wherein the bandwidth allocated to the first virtual NIC is returned to the virtual network stack associated with the first virtual NIC.

15. The non-transitory computer usable medium of claim 11, wherein the bandwidth reallocation is performed by a management software.

16. The non-transitory computer usable medium of claim 11, wherein a sum of the bandwidth allocated to the first virtual NIC and a bandwidth allocated to a second virtual NIC operatively connected to the NIC is equal to the network bandwidth.

17. The non-transitory computer usable medium of claim 16, wherein the first virtual NIC and the second virtual NIC are associated with the Media Access Control (MAC) layer of the host, and wherein the first virtual NIC and the second virtual NIC each associated with one or more Internet Protocol (IP) address.

* * * * *